United States Patent [19]
Brent et al.

[11] Patent Number: 4,812,882
[45] Date of Patent: Mar. 14, 1989

[54] CONTRAST MONITOR

[75] Inventors: Richard J. Brent, Handforth; Brian F. Moss, Chelford, both of England

[73] Assignee: Ciba-Geigy AG, Switzerland

[21] Appl. No.: 98,230

[22] Filed: Sep. 18, 1987

[30] Foreign Application Priority Data

Oct. 14, 1986 [GB] United Kingdom ............... 8624605
Dec. 17, 1986 [GB] United Kingdom ............... 8630185

[51] Int. Cl.⁴ .................................................. G03B 27/32
[52] U.S. Cl. ........................................ 355/77; 355/68
[58] Field of Search .................... 355/97, 68, 71, 35; 356/218, 219, 226, 227

[56] References Cited

U.S. PATENT DOCUMENTS 2,411,486 11/1946 Weisglass ........................... 356/223
3,647,297 3/1972 Van Westering .................... 355/68

FOREIGN PATENT DOCUMENTS 1116576 9/1966 United Kingdom.
2096336 3/1982 United Kingdom.

OTHER PUBLICATIONS

Article "Enlarger Analyser" Wireless World, vol. 86, No. 1531, p. 91, Mar. 1980.

Labortechnik Brochure—Jobo, Comparator 2, printed in Germany, 12/86.

Primary Examiner—L. T. Hix
Assistant Examiner—D. Rutledge
Attorney, Agent, or Firm—Burns, Doane, Swecker & Mathis

[57] ABSTRACT

There is described a method of determining the contrast grade of the paper to be used to print a black and white photographic negative which comprises placing a photocell in the darkest significant area of a projected negative image and noting an indication of the light received or calibrating the photocell so when the photocell receives light of the same level it will indicate this, then placing the photocell in the lightest significant area of the projected image of the negative and reducing the light reaching the photocell using graduated steps until the light reaching the photocell is of the same level as the light which reached the photocell when it was placed in the darkest significant area of the projected negative image and noting the step employed to achieve this equivalence and selecting the contrast grade of the paper which is indicated by the step which achieved equivalence. The method can be performed using an enlarger or by use of a modified light exposure meter.

13 Claims, 5 Drawing Sheets

CONTRAST MONITOR

This invention relates to a method and apparatus for determining the contrast grade of paper to be employed when printing black and white negatives on to black and white paper in an enlarging process.

Photographic negatives having a high contrast that is to say a big difference between the highlight and shadow areas are required to be printed on low contrast paper that is to say paper of so-called grade 0 or 1. On the other hand soft negatives having little difference between highlight and shadow areas are required to be printed on high contrast paper that is to say paper of so-called grade 3 or 4 or even very occasionaly grade 5.

Enlarging exposure meters which are used to determine the optimum exposure required for each set of negatives or each batch of paper have been manufactured so that they can also be used to determine the difference in light levels between the highlight areas and in the darkest areas of a projected image and provision is made so that this difference can be translated by electronic means to give an indication of the grade of paper which should be used to print the projected negative. However such exposure meters/contrast comparators are expensive.

We have discovered a simpler way of modifying and/or using an enlarging exposure meter to determine the contast grade to be used for printing a negative.

Therefore according to the present invention there is provided a method of determining the contrast grade of the paper to be used to print a black and white photographic negative which comprises placing a photocell in the darkest significant area of a projected negative image and noting an indication of the light received or calibrating the photocell so when the photocell receives light of the same level it will indicate this, then placing the photocell in the lightest significant area of the projected image of the negative and reducing the light reaching the photocell using graduated steps until the light reaching the photocell is of the same level as the light which reached the photocell when it was placed in the darkest significant area of the projected negative image and noting the step employed to achieve this equivalence and selecting the contrast grade of the paper which is indicated by the step which achieved equivalence.

By darkest significant area is meant that area of the projected negative image which is the darkest area in which some detail is visible. For example in a negative of a landscape there is often present in the negative some sky. If areas of this sky are completely clear and devoid of clouds then no detail would be visible in the projected negative. However if some cloud were present this could be a darkest significant area which could be used in the method of the present invention.

Conversely by lightest significant area is meant the lightest area of the projected image in which some detail is visible. For example often very dark shadows comprise no detail at all but areas adjoining such shadows do contain some detail and such areas could be a lightest significant area which could be used in the method of the present invention. If the difference between a clear sky and a very dark shadow were used to determine the contrast of paper to be used then a too soft a paper would be indicated which would not produce a properly balanced point.

In one method of the present invention the light reaching the photocell is reduced by use of neutral density filters. Neutral density filters can be prepared having different density values each of which corresponds to a different grade of paper. A set of six neutral density filters can be prepared which correspond to the log exposure scale of the normally used six grades of paper. These will vary slightly for each paper manufacturer. Alternatively a filter which is a substantially circular band or is a strip of increasing optical density can be used with marking thereon to indicate which areas relate to which grade.

For one set graded papers the log exposure scale which corresponds with the neutral density for a set six graded papers is as follows:

| Log E.S. | Paper Grade |
|----------|-------------|
| 1.7 | 0 |
| 1.5 | 1 |
| 1.3 | 2 |
| 1.1. | 3 |
| 0.9 | 4 |
| 0.7 | 5 |

The set neutral density filters may be arranged one after the other on a strip and each one in turn in placed over the photocell until light equivalence is reached. Most preferably however the set of neutral density filters are arranged round the periphery of a rotatable disc which is mounted over the photocell.

In another method of the present invention the light reaching the photocell is reduced by use of a mask which comprises a continuous slit of decreasing width which partially covers the photocell and which can be moved over the photocell. This slit may be in the form of a strip or in the form of a circular band in a disc. In a modification of this method a solid rotatable disc of decreasing diameter is used to reduce the light reaching the photocell. The disc at the point of greatest diameter completely covers the photocell and at the point of the smallest diameter the photocell is completely uncovered but at intermediate points in the rotation of the disc varying amounts of the photocell are covered. As with the neutral density filters the discs or the strips are graduated to indicate which grade of paper should be used at the position of light equivalence. The continuous slits or disc of varying diameter can be calibrated by comparing the light cut out at any particular point with a neutral density filter which is known to correspond to a known paper grade.

In an alternative method of the present invention the light reaching the photocell is reduced by stopping down the enlarging lens of the enlarger used to project the negative image. Most enlargers have a graduated series of stops labelled f/4, f/5.6, f/8, f/11 and f/16. The stop f/5.6 reduces the amount of light to half that of f/4 and so on down the series. The increase in equivalent density between each stop is 0.3. Thus there is a difference in equivalent density of 1.2 between f/4 and f/16. This is not enough to cover the complete density range to accomodate 6 grades of paper which requires a density range of 1.7 as set forth above. Thus preferably a neutral density filter of 0.7 is employed in this method of the present invention.

Thus in a preferred mode of practising this alternative method using a photographic enlarger there is provided a method which comprises setting the enlarger lens to f/4, placing a photocell in the darkest significant area of a projected negative image, noting an indication of the light received or calibrating the photocell so that when it receives light of the same level it will indicate this, then placing the photocell in the lightest significant area of the projected image of the negative, placing a neutral density filter of 0.7 between the light and the photocell, if light equivalence with the darkest significant area is established then grade 5 paper for printing is indicated, if not then stop the lens down to f/5.6 and continue stopping down the lens until light equivalence is reached, the choosing the grade of paper indicated by the stop according to table set forth below.

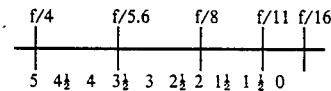

With many enlargers it is possible to stop the enlarging lens down by half a stop and this enables a closer identification of the requisite paper grade to be achieved and also a better balance between the stops.

As hereinbefore stated the light equivalence levels of the light reaching the photocell when placed in the darkest significant area and in the lightest significant area after reducing the light reading the photocell are determined either by noting when the photocell readings are the same or by calibrating the photocell. This means altering a switch to indicate an arbitary mark on a scale in the darkest significant area and attaining the same arbitary mark on the scale when in the lightest significant area to indicate equivalence of light levels. However in one particularly useful meter which comprises a photocell there are provided three light emitting diodes (LEDs) in a line, one red, then one green and then a red. One only lights up at a time. A setting knob enables the central green LED to be lit up when the photocell is in the darkest significant area. Then when the photocell is placed in a higher light level the green LED goes out but the left hand red LED lights up, when the photocell is placed in a lower light level the green LED goes out and the right hand scale LED lights up. When the photocell is present in the same light level the two red LED's are not lit but the central green LED lights up. Thus the photocell is calibrated in this case by causing the control green LED to light up when the photocell is in the darkest significant are. Light level equivalence is indicated when the central green LED remains on or is lit up after one or other red LED has glowed.

According to another feature of the present invention there is provided a light exposure meter which comprises a photocell, three light emitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc carrying around its periphery a graduated set of six neutral density filters, the disc being so mounted that each filter in turn can be placed over the photocell, but there being at least one point in the rotation of the disc when the photocell can receive light directly from a light source without a neutral density filter being interposed.

According to another embodiment of this feature of the present invention there is provided a light exposure meter which comprises a photocell, three light emmitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc or a strip carrying a length of neutral density filter of increasing optical density, the disc or strip being so mounted that each area of different density can be placed over the photocell, and each area having been calibrated to correspond to the log exposure scale of the normally used grades of paper, but there being at least one point in the rotation of the disc or in the lengthwise movement of the strip when the photocell can receive light directly from a light source without any part of the neutral density filter being interposed.

According to another embodiment of this feature of the present invention there is provided a light exposure meter which comprises a photocell, three light emitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a solid rotatable disc of decreasing diameter such that the point of its greatest diameter the photocell is completely covered by the disc and at the point of its smallest diameter no part of the photocell is covered by the disc whilst varying amounts of the photocell are covered by the disc as its is rotated between these two points and each segment of the periphery of the disc having been calibrated to correspond to the log exposure scale of the normally used grades of paper.

According to a fourth embodiment of this feature of the present invention there is provided a light exposure meter which comprises a photocell, three light emitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc or a lengthwise movable strip which comprises a slit of varying width which partially covers the photocell and which can be moved over the photocell to cover increasing or decreasing amounts of the photocell and each portion of the slit having been calibrated to correspond to the log exposure scale of the normally used grades of paper, but there being at least one point in the rotation of the disc or in the lengthwise movement of the strip when the photocell can recieve light directly from a light source without any part of the photocell being covered by the disc or the strip.

The accompanying drawings will serve to illustrate the invention.

Figure 1:
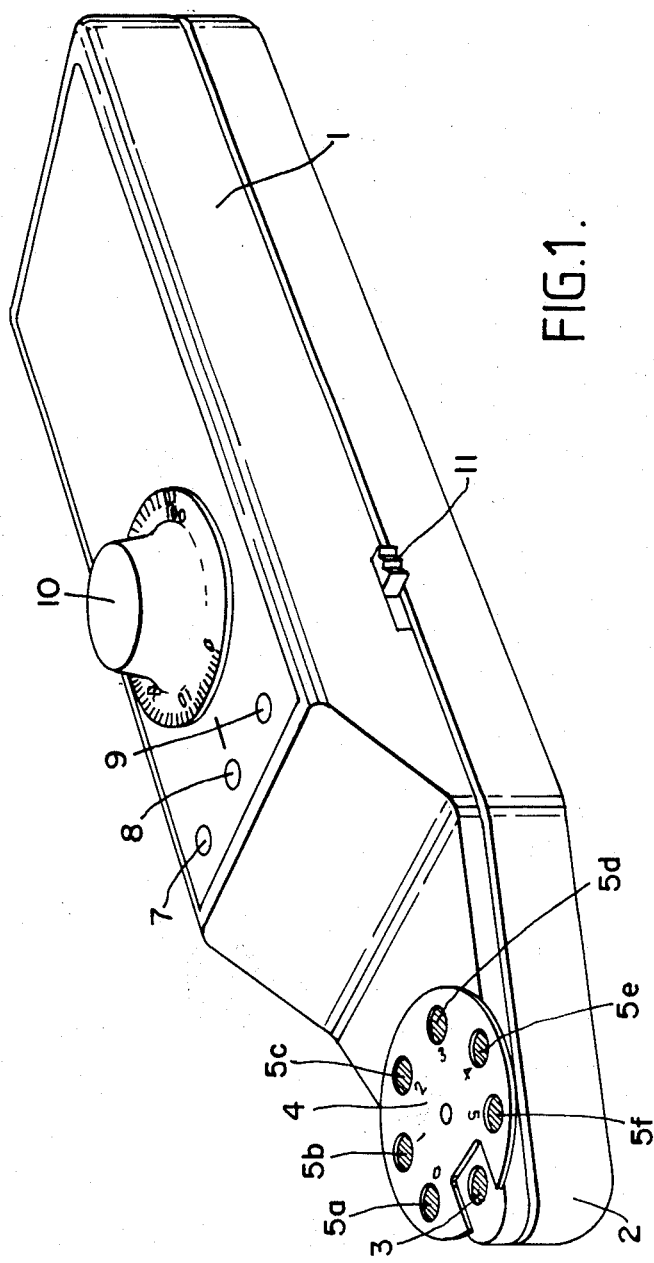
FIG. 1 is a modified light exposure meter which comprises a photocell for use in the method of the present invention.

In FIG. 1 the light exposure meter comprises a holder 1 which comprises at the end of a wedge shaped end 2 a photocell 3. Mounted above the photocell 3 is a rotatable disc which carries around its periphery equidistantly spaced six neutral density filter 5a, 5b, 5c, 5d, 5e, and 5f. By the side of each filter is a number 0 to 5. This indicates the grade of paper to which this neutral density filter is equivalent.

On the main body of the exposure meter are those LEDs 7,8 and 9 in a row. LED 7 and LED 9 are red and LED 8 is green. On top of the body 1 is a rotatable knob 10. This knob has around its periphery an arbitary numerical scale which can be used to calibrate the meter when used to measure exposure. An on/off switch 11 is present on the side of the meter.

Figure 2:
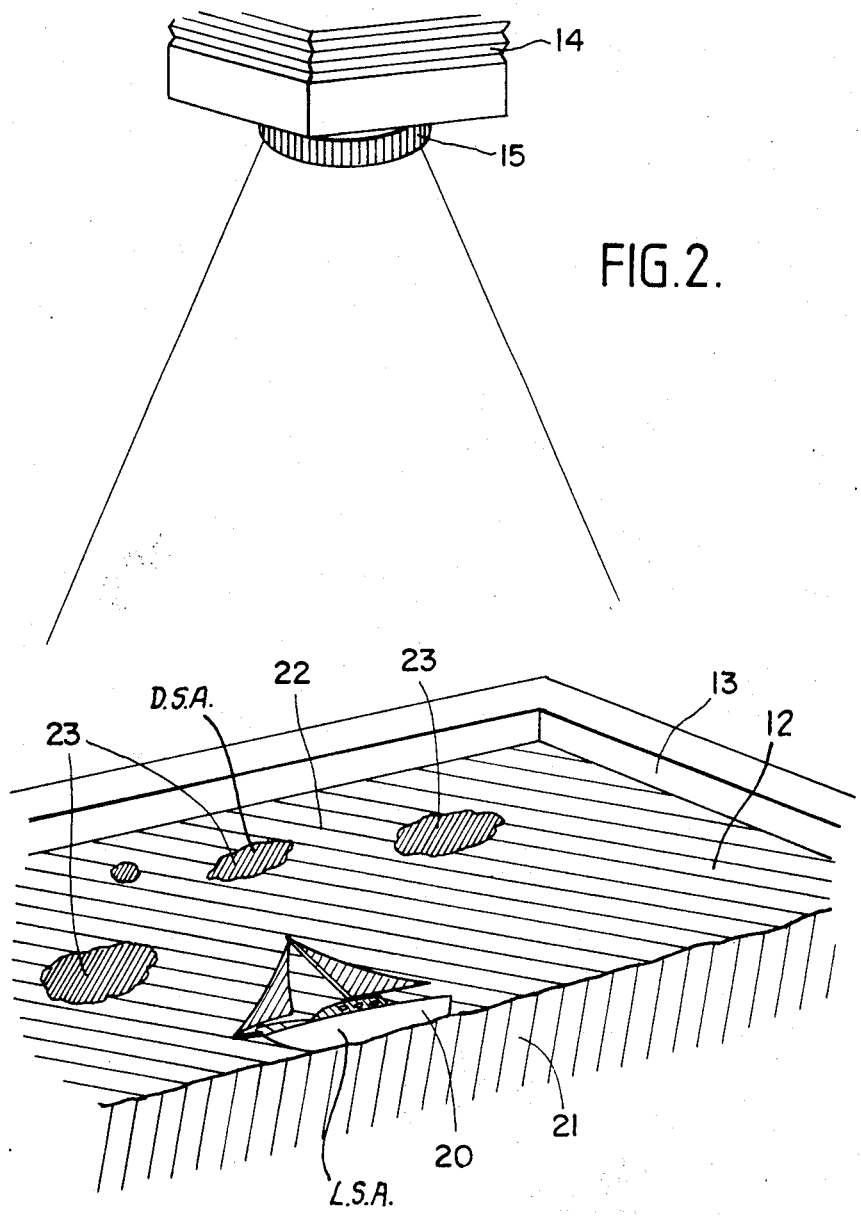
FIG. 2 shows a photographic negative projected by an enlarger onto a baseboard.

In FIG. 2 is shown a projected negative image 12 on a baseboard outlined by the edges 13. The image has been projected by an enlarger 14 through lens 15. The negative in the enlarger is not shown.

The projected image for ease of explanation shows the negative image of a ship 20 which has a black hull and dark blue sails on a darkish sea 21 with a dark sky as the background 22 but with some white clouds 23 in the sky. An examination of this image indicated than one of the clouds 23 could be used as the darkest significant area and the hull of the boat 20 could be used as the lightest significant area.

To employ the method of the present invention to determine the correct grade of paper in which to print this negative the photocell 3 on the light exposure meter is placed on the base board over the selected cloud 23 with no filter in the light path. The knob 10 is then rotated until the green LED 8 lights up. The photocell 3 in the light exposure meter is then placed on the base board over the hull of the ship 20 with no filter in the path. As more light is now reaching the photocell than reached it when it was placed over the cloud 23 the green LED goes out and the left hand red LED 9 lights up. The disc 4 is then rotated to bring neutral density filter 5f between the photocell and the projected light. Red LED 9 still glows. The disc 4 is rotated further to bring neutral density filter 5e between the photocell and the projected light. Red LED 9 still glows. The disc is rotated further to bring neutral density filter 5d between the photocell and the projected light. The red LED 9 still glows. The disc is rotated further to bring neutral density filter 5c between the photocell and the projected light. At this point red LED 9 stops glowing and green LED 8 lights up.

The indicates light level equivalence between the darkest significant area and the lightest significant area with the light on it having been reduced by a graduated step. An examination of the disc 4 shows the number 2 by the neutral density filter 5c thus the negative in the enlarger should be printed using grade 2 paper to yield a contrast balanced negative.

Figure 3:
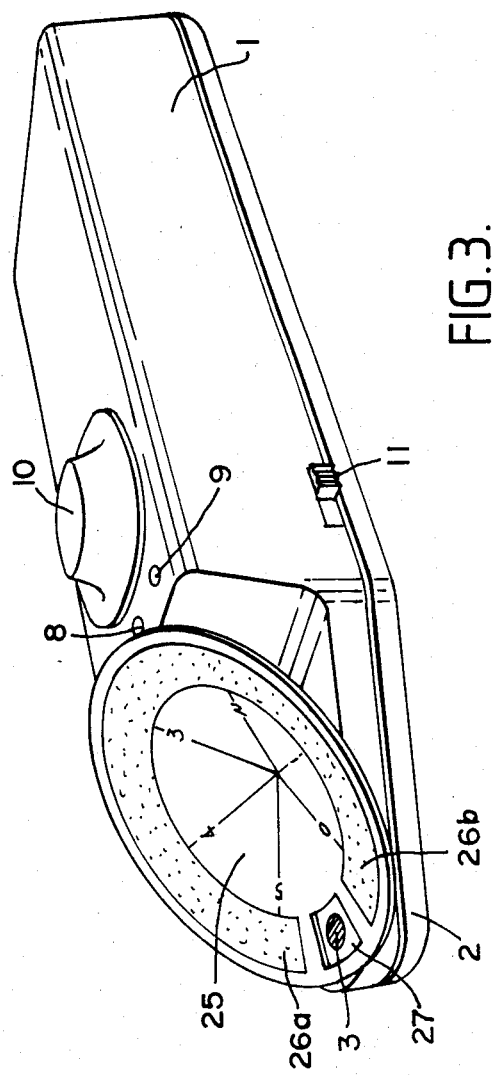
FIGS. 3, 4 and 5 show modified light exposure meters with alternative devices for alternating the light reaching the photocell.
Figure 4:
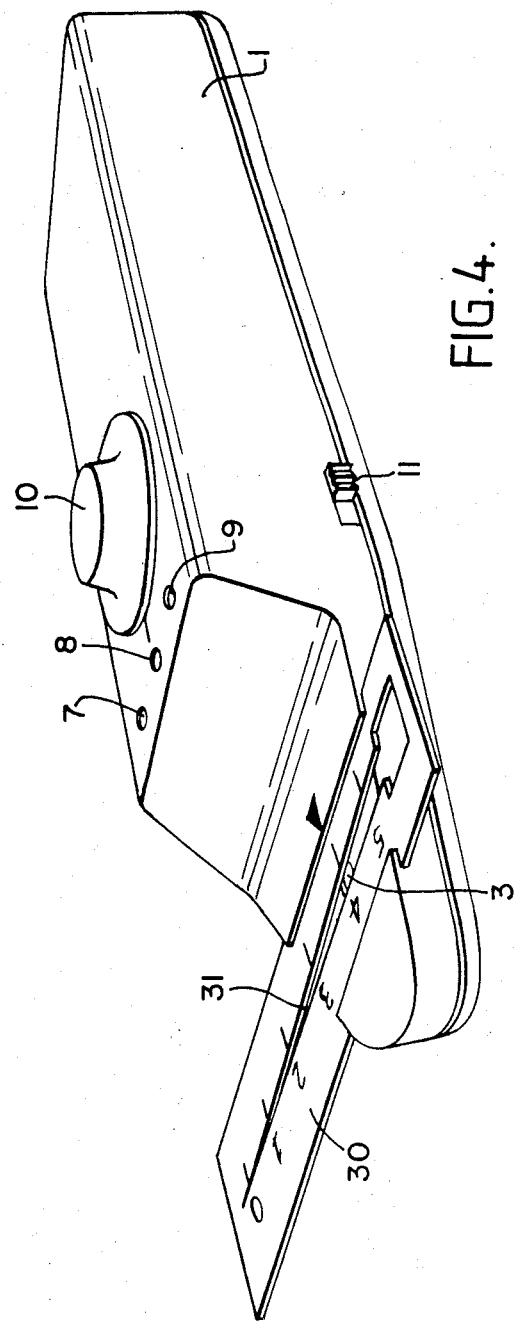
Figure 5:
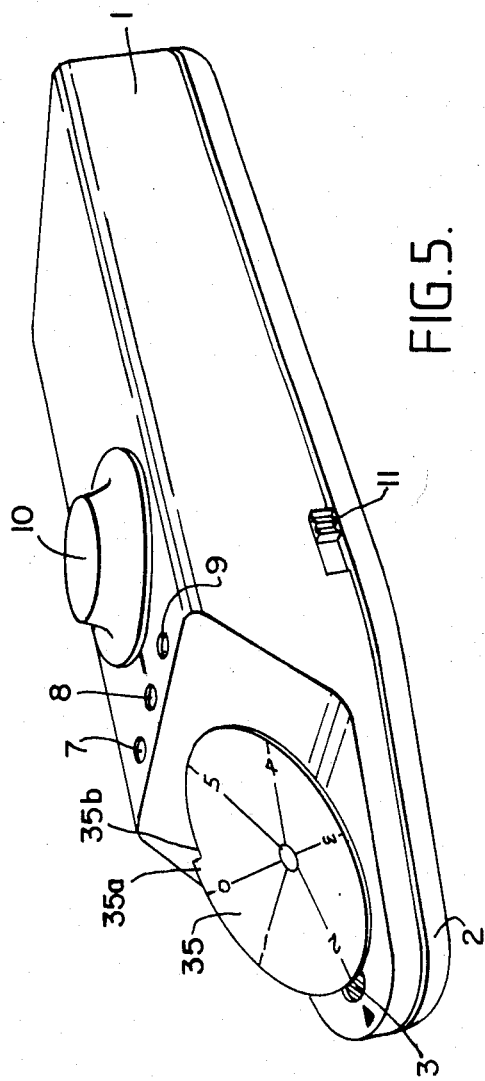

In FIGS. 3,4 and 5 the numerals 1,2,3,7,8,9,10 and 11 have the same signification as those in FIG. 1.

In the light exposure meter of FIG. 3 the rotatable disc 4 of FIG. 1 has been replaced by the rotatable disc 25 which instead of bearing around its periphery six neutral density filter as does the meter of FIG. 1, it carries a circular band of a neutral density filter of varying optical density 26, the band having the greatest optical density at 26a and the least optical density at 26b. The area 27 of the disc is clear and allows the photocell 3 to reach light directly from the light source without any part of the length of neutral directly filter 26 being interposed. The disc has been calibrated to show the grade of paper equivalent to each angular displacement of the disc to achieve light equivalence.

In the light exposure meter of FIG. 4 a lengthwise moveable strip of cardboard 30 comprises a slit of varying width 31 which as shown in FIG. 4 partially covers the photocell 3. One end of the slit comprises a hole 32 which when placed over the photocell does not cover any of the photocell. This strip 30 has been calibrated to show the grade of paper equivalent to each lengthwise movement of the strip to achieve light equivalence.

In the light exposure meter of FIG. 5 a solid rotatable disc 35 has a diameter which is at a maximum at 35a and which decreases to a minimum at 35b. When the disc is rotated so that point 35a is over the photocell 3 no light can reach the photocell but when it is rotated so that point 35b is over the photocell 3 light can reach the photocell unobscured by the disc but at all points in between a varying proportion of the photocell 3 is covered by the disc 35. The disc has been calibrated to show the grade of paper equivalent to each angular rotation of the disc to achieve equivalence.

The light exposure of FIGS. 3–5 are used in an analogous manner to the meter of FIG. 1 to determine which grade of paper should be used for a given exposure.

We claim:

1. A method of determining the contrast grade of the paper to be used to print a black and white photographic negative which comprises placing a photocell in the darkest significant area of a projected negative image and noting an indication of the light received or calibrating the photocell so when the photocell receives light of the same level it will indicate this, then placing the photocell in the lightest significant area of the projected image of the negative and reducing the light reaching the photocell using graduated steps until the light reaching the photocell is of the same level as the light which reached the photocell when it was placed in the darkest significant area of the projected negative image and noting the step employed to achieve this equivalence and selecting the contrast grade of the paper which is indicated by the step which achieved equivalence.

2. A method according to claim 1 wherein the light reaching the photocell is reduced by using one of a set of graduated neutral density filters.

3. A method according to claim 2 wherein there are six neutral density filters in the set which corresponds to the log exposure scale of the normally used six contrast grades of paper.

4. A method according to claim 1 wherein the light reaching the photocell is reduced by using a neutral density filter which is a substantially circular band of increasing optical density or is a strip of increasing optical density, both the strip or the band having markings thereon to indicate which areas relate to which paper grade.

5. A method according to claim 1 wherein the light reaching the photocell is reduced by use of a mask which comprises a continuous slit of decreasing width which partially covers the photocell and which can be moved over the photocell, the mask having markings thereon to indicate which areas of the slit relate to which paper grade.

6. A method according to claim 5 wherein the slit is in the form of a strip or is in the form of a circular band in a disc.

7. A method according to claim 1 wherein the light reaching the photocell is reduced by use of a solid rotatable disc of decreasing diameter, the disc at the point of greatest diameter completely covering the photocell and at the point of smallest diameter the photocell is completely uncovered, but at intermediate points in the rotation of the disc varying amounts of the photocell are covered, the disc having markings thereon to indicate which areas relate to which paper grade.

8. A method according to claim 1 wherein the light reaching the photocell is reduced by stopping down the enlarging lens of the enlarger used to project the negative image using one of the graduated series of stops.

9. A method according to claim 8 which comprises setting the enlarger lens to f/4, placing a photocell in the darkest significant area of a projected negative image, noting an indication of the light received or calibrating the photocell so that when it receives light of the same level it will indicate this, then placing the photocell in the lightest significant area of the projected image of the negative, placing a neutral density filter of 0.7 between the light source and the photocell, if light equivalence with the darkest significant area is established then grade 5 paper for printing is indicated, if not then stop the lens down to f/5.6 and continue stopping down the lens until light equivalence is reached, then choosing the grade of paper indicated by the stop.

10. A light exposure meter which comprises a photocell, three light emitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc carrying around its periphery a graduated set of six neutral density filters, the disc being so located that each filter in turn can be placed over the photocell, but there being at least one point in the rotation of the disc when the photocell can receive light directly from a light source without a neutral density filter being interposed.

11. A light exposure meter which comprises a photocell, three light emmitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc or a strip carrying a length of neutral density filter of increasing optical density, the disc or strip being so mounted that each area of different density can be placed over the photocell, and each area having been calibrated to correspond to the log exposure scale of the normally used grades of paper, but there being at least one point in the rotation of the disc or in the lengthwise movement of the strip when the photocell can receive light directly from a light source without any part of the neutral density filter being interposed.

12. A light exposure meter which comprises a photocell, three light emmitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a solid rotatable disc of decreasing diameter such at the point of its greatest diameter the photocell is completely covered by the disc and at the point of its smallest diameter no part of the photocell is covered by the disc whilst varying amounts of the photocell are covered by the disc as it is rotated between these two points and each segment of the periphery of the disc having been calibrated to correspond to the log exposure scale of the normally used grades of paper.

13. A light exposure meter which comprises a photocell, three light emitting diodes (L.E.D.'s) and a control means which can be actuated to cause a first L.E.D. to glow when the photocell receives light, means to cause a second L.E.D. to glow when the photocell receives light of a greater level than that received by it when the first L.E.D. was caused to glow, means to cause the third L.E.D. to glow when the photocell receives light of a lower level than that received by it when the first photocell was caused to glow, a rotatable disc or a lengthwise movable strip which comprises a slit of varying width which partially covers the photocell and which can be moved over the photocell to cover increasing or decreasing amounts of the photocell and each portion of the slit having been calibrated to correspond to the log exposure scale of the normally used grades of paper, but there being at least one point in the rotation of the disc or in the lengthwise movement of the strip when the photocell can receive light directly from a light source without any part of the photocell being covered by the disc or the strip.

* * * * *